United States Patent [19]

Johnson et al.

[11] Patent Number: 4,799,216

[45] Date of Patent: * Jan. 17, 1989

[54] DISTRIBUTED SWITCHING SYSTEM

[75] Inventors: Charles B. Johnson, Dallas; Jeffrey L. Box, Farmers Branch; David B. Hildebrand, Bedford, all of Tex.

[73] Assignee: SRX Corporation, Dallas, Tex.

[*] Notice: The portion of the term of this patent subsequent to Aug. 4, 2004 has been disclaimed.

[21] Appl. No.: 46,233

[22] Filed: May 4, 1987

Related U.S. Application Data

[63] Continuation of Ser. No. 706,320, Feb. 27, 1985, Pat. No. 4,685,104.

[51] Int. Cl.$^4$ .................... H04Q 11/04; H04J 3/02
[52] U.S. Cl. ................................ 370/67; 370/85
[58] Field of Search .............. 370/85, 67, 95, 88, 370/89, 66

[56] References Cited

U.S. PATENT DOCUMENTS 3,171,896 3/1965 Bartlett et al. ................... 370/67
4,488,290 12/1984 Dunn et al. ...................... 370/67

Primary Examiner—Douglas W. Olms
Assistant Examiner—Wellington Chin
Attorney, Agent, or Firm—Ross, Howison, Clapp & Korn

[57] ABSTRACT

A distributed switching system (20) is provided for implementation in an integrated circuit utilizing a switching bus (30) in which bus lines (30a–30n) are time division multiplexed serial data streams consisting of time slots used for both transmit and receive directions. The bus lines (30a–30n) comprise a single bi-directional bus used for both inter-processor communication and for transparent voice and data switching. The distributed switching system (20) includes a bus line selector (31) to select one of the plurality of bus lines (30n–30n) to perform space switching functions. A slot counter (32) is provided for selecting one of a plurality of time slots on the plurality of bus lines (30n–30n) to perform a time switching function. Interface shift registers (33, 35) are interconnected for transmitting to and receiving data from the switching bus (30). Interconnected to the bus registers (33, 35) is a line interface register (34) for transmitting to and receiving data from a digital instrument.

19 Claims, 4 Drawing Sheets

DISTRIBUTED SWITCHING SYSTEM

RELATED APPLICATION

This application is a continuation of U.S. application Ser. No. 706,320, filed Feb. 27, 1985 and entitled "Distributed Switching System", now U.S. Pat. No. 4,685,104.

TECHNICAL FIELD

This invention relates to digital communication systems, and more particularly to the implementation of a distributed voice and data switch with line interface on a single integrated circuit.

BACKGROUND ART

The evolution of digital communications has been made possible by advancements in integrated circuitry. Various components of a complete digital voice and data switching system have been implemented in integrated circuit form.

In a conventional digital time division switching matrix, each of N input lines is a time division multiplexed link consisting of a continuous serial data stream subdivided into M serial words, or "time slots". Each group of time slots constitutes one frame. Standards developed by the Bell System and the International Telegraph and Telephone Consultative Committee (CCITT) have resulted in 8 bit time slots and 125 microsecond frame times (8 KHz voice sampling) being used in telephone systems throughout the world. The CCITT standard, for example, provides for 32 time slots or channels (256 bits) per frame. Thirty of the channels are used for voice; the remaining two for frame synchronization and signalling (control information).

The function of the time and space switch is to transfer information from a specified time slot on an incoming link to a specified time slot on an outgoing link. For a connection to be made, two types of switching operations must be performed. Switching from one link to another requires spatial translation (space switching). Switching from one time slot to another requires time translation (time switching). In a full-duplex connection between two arbitrary ports, each input time slot is paired with the same slot on the corresponding output link. Two connections must be made to allow information to be transferred in both directions between the two ports. It should be noted that 2N serial links and a total of 4 "port appearances" (4 time slots) for a connection are required using this switching scheme.

A multitude of architectural variations on time and space switching have been implemented. Various configurations such as time-space-time (TST) and space-time-space (STS) have been utilized, each with its own set of merits and drawbacks. However, all these variations still result in a minimum of 2N serial links and 4 port appearances. The reason for this result is that the digital switch matrix has always been considered a separate entity from the digital line interface to instruments. The purpose of a conventional switch matrix is to translate TDM channels from a set of input links to a separate set of output links; hence the need for 2N links. The conventional switch matrix is symmetrical; input and output formats are identical. The digital line interface circuitry in a conventional communication system then takes a given TDM output link and routes data from a specified time slot to a digital instrument via a twisted pair line. Similarly, the line interface circuitry also routes data from the digital instrument to a specified time slot on the corresponding TDM input link. Since the digital line interface is separate from the switch, the switch itself must be sized to allow for future growth in the number of ports in a system. This configuration is inefficient and adds cost to the system since more switching circuitry is present than is actually needed. A further disadvantage of the conventional switch matrix is that it is difficult to distribute portions of the switch to different printed circuit cards within the system. This is because every line interface port must be able to access every time slot of every input and output TDM link.

Elements of a central switch matrix have been fabricated in both NMOS and CMOS technology. The Thompson Semiconductor EF7331 and the SGS Semiconductor M088 are NMOS devices that switch 256 speech samples from 8 PCM in-going trunks to 256 speech samples from 8 PCM out-going trunks. Mitel's MT8980 is a CMOS device that performs the same function as the EF7331 and the M088. These time/space circuits are generally designed to be located together in the central equipment in one array. These devices do not offer any type of line interface capability.

Time slot selection circuitry has also been integrated. The Motorola MC14416 is a per-channel time slot assigner designed to provide receive and transmit time slot assignment for a PCM codec. This device performs the time division multiplexing function for a single codec on a single TDM link. Space switching is not performed. The device is intended to interface directly to a codec circuit on a line or trunk card and therefore does not include any twisted pair line interface circuitry such as an AMI encoder. The National TP3155 is similar in function to the Motorola MC14416, but slot assignment is performed for four separate codec circuits.

A digital line interface circuit has been integrated in CMOS technology. The Motorola MC145422 "UDLT" device transmits digital signals present at a codec-type interface over standard twisted pair phone wires using a "ping-pong" transmission scheme. The device services one port only and no switching functions are performed.

A digital line interface module has been built which provides an interface between a single twisted pair line and a single serial TDM data stream. The Mitel MH89700 device combines elements of time slot selection with a digital line interface but is intended for use with a central matrix switch. Space switching is not performed. Furthermore, the device is a hybrid module; not a single monolithic device.

A need has thus arisen for a distributed voice and data switching system complete with line interfaces for connections to digital telephones or data devices implemented in integrated circuit technology and which combines the switching and line interface functions in such a way as to minimize TDM links and their accompanying circuitry. A need has further arisen for a switching system in which the switching and line interface functions are combined to minimize port appearances, thereby reducing the system bandwidth requirements. A need has further arisen for a switching system which can be implemented on a per-port basis, thereby allowing for linear expansion of the system as ports are added.

DISCLOSURE OF THE INVENTION

In accordance with the present invention, a distributed switching system is provided which substantially eliminates the problems heretofore associated with distributed voice and data switching systems.

In accordance with the present invention, a distributed switching system for implementation in an integrated circuit utilizes a bus architecture in which bus lines are time division multiplexed serial data streams consisting of time slots utilized for both transmit and receive directions wherein the bus lines comprise a single bi-directional bus used for both inter-processor communication and for transparent voice and data switching, thereby minimizing the number of time division multiplex links required to implement a switching system.

In accordance with another aspect of the present invention, a distributed switching system for implementation in an integrated circuit is provided. The system includes space and time switching circuitry included within each digital line interface to thereby provide for switching on a per-port basis. Space and time switching circuitry is further included with each digital line interface to provide a switch that is linearly expandable.

BRIEF DESCRIPTION OF THE DRAWINGS

For a more complete understanding of the present invention and for further advantages thereof, reference is now made to the ,following Detailed Description taken in conjunction with the accompanying Drawings, in which.

DETAILED DESCRIPTION

Figure 1:
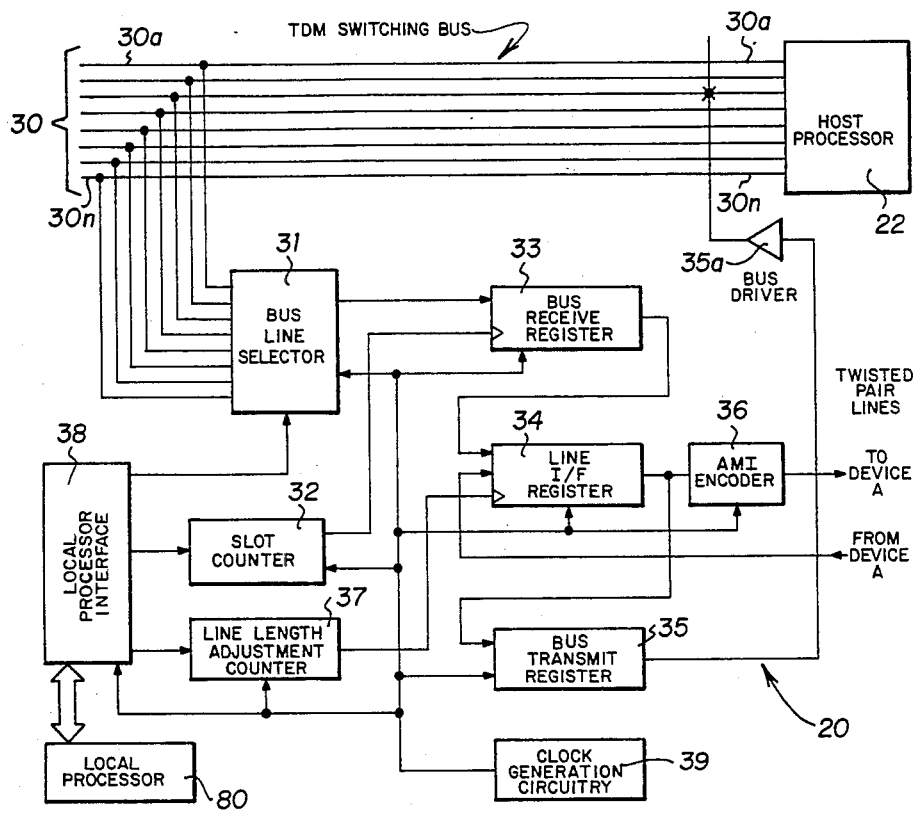
FIG. 1 is a block diagram of the present invention showing the interface of one port to the switching bus.

Referring to FIG. 1, there is provided a block diagram of the present switching system generally identified by the numeral 20. Switching system 20 is used with a host processor 22 and includes a switching bus 30 consisting of N bus lines 30a–30n. Each bus line 30a–30n is a time division multiplexed (TDM) serial data stream consisting of M 8-bit time slots. Each group of M time slots repeats every frame (125 microseconds), corresponding to the 8 KHz sampling rate for voice systems standardized by the Bell System and the International Telegraph and telephone Consultative Committee (CCITT).

The present switching system 20 is implemented on a single integrated circuit or a "switch chip" which consists of a common local processor interface and common clock generation logic. The circuitry shown in FIG. 1, is duplicated on a per-port basis such that each switch chip of switching system 20 generally handles multiple ports. Since all space and time switching elements of the present switching system 20 are provided with each line interface, switching system 20 is automatically expanded as ports are added to the communication system. This architecture provides for linear growth up to the maximum bandwidth of the bus utilized. As an example, an eight line bus operating at 4.096 MHz offers an aggregate bandwidth of over 32 Mbps and can handle up to 512 total ports including voice, data and control at 64 Kbps per-port.

Since switching system 20 is handled on a per-port basis, a large, centrally located switch matrix is not required. This architecture allows switching system 20 to be located on the line and trunk cards of the communications system.

A bus line selector 31 has inputs connected to all N bus lines 30a–30n. The bus line selector 31 also has an input for loading a bus line address. This address is furnished to the bus line selector 31 by local processor interface circuitry 38. The bus line selector 31 performs the function of routing data from one particular bus line 30a–30n specified by the bus line address from switching bus 30 to the bus receive register 33.

A slot counter 32 has an input for loading a slot address which is furnished to the slot counter 32 by local processor interface circuitry 38. Slot counter 32 provides a burst of 8 clocks to clock the bus receive register 33. This burst of clocks occurs during one particular time slot specified by the slot address. The clock frequency of the burst corresponds to the data rate of switching bus 30 and results in data from the selected time slot on the bus line 30a–30n selected by bus line selector 31 being clocked into bus receive register 33.

A line interface register 34 is connected to bus receive register 33 and is used to handle data to and from remote device A. This bi-directional communication is intended to occur in time division multiplexed fashion over a single twisted pair telephone cable. Data in line interface register 34 is clocked out at the line clock rate through AMI encoder 36. AMI encoder 36 codes the data in a format known as alternate mark inversion, a commonly used data coding format for bi-directional data transmission. After device A receives the transmitted burst, device A responds with a return burst. This return burst will appear back at line interface register 34 at different times depending on the line length between the switching system and the remote device.

A line length adjustment counter 37 is provided to compensate for the propagation delay of the twisted pair wire. Line length adjustment counter 37 has an input for loading a line length value which is provided by local processor interface circuitry 38. Line length adjustment counter 37 provides an output clock burst at the line clock rate used for clocking data received from device A into line interface register 34. This clock burst is skewed by fractions of bit times as well as full bit times corresponding to the line length value that it is assigned.

At the beginning of each frame, data residing in bus receive register 33 is clocked into line interface register 34 and data residing in line interface register 34 is clocked into a bus transmit register 35. This data exchange results in data received from switching bus 30 being placed in line interface register 34 for subsequent transmission to remote device A. The data exchange also results in data previously received from remote device A being placed in bus transmit register 35 for subsequent transmission back on switching bus 30. Data residing in bus transmit register 35 is clocked out at the data rate of switching bus 30 during a fixed time slot. A bus driver 35a writes this data received from bus transmit register 35 on a single assigned bus line 30a–30n. Timing and control signals for elements 31, 32, 33, 34, 35, 36, 37, and 38 are provided by clock generation circuitry 39. A typical monolithic implementation of switching system 20 would consist of a single common local processor interface 38 and clock generation circuitry 39. Circuit elements 31, 32, 33, 34, 35, 36, and 37 are "port" elements duplicated on a per-port basis for each remote device that is served by the same integrated circuit. Since switching is handled on a per-port basis utilizing the present switching system 20, a large, centrally located switch matrix is not required. The local processor on the line or trunk card can then control local switching as well as other card supervision activities. The present switching system 20 architecture also allows a significant reduction in the complexity of system tone generation circuitry. By placing tone and silence information in PCM form in specific time slots on bus 30, the local processor can cadence tones by alternatively switching between the specific tone slot and the silent slot at a periodic rate. Paging can be accomplished by sending a command to all local processors to assign all ports to listen to the same transmit time slot. Monitoring of system-wide broadcast control information can also be handled by the local processor simply by reading a designated broadcast control time slot.

Figure 2:
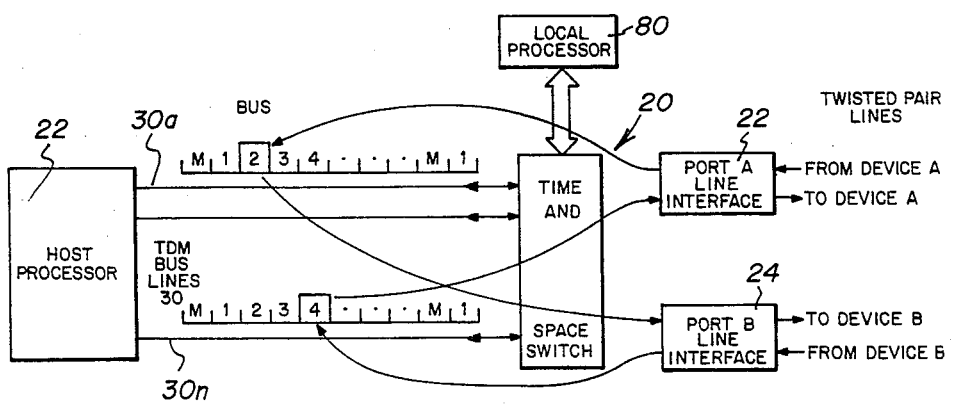
FIG. 2 is a generalized diagram showing the bus organization employed by the present invention.

FIG. 2 illustrates a generalized diagram showing the bus organization employed by the present switching system 20.

switching bus consists of bus lines 30a–30n, each bus line consisting of a continuous serial data stream. Each serial data stream is sub-divided into M serial words, or "time slots". These time slots consist of pCM voice samples, transparent data, and control information to or from local processors, digital telephones or data devices. The bus, therefore, resembles a set of N time division multiplexed (TDM) links. However, unlike a conventional switch matrix having separate input and output links containing input and output time slots, switching bus 30 time slots provide both input and output functions simultaneously. This is accomplished in the following manner:

1. Ports are assigned fixed bus lines and fixed time slot locations to transmit on, thus reducing the number of bus drivers required.

2. All switching occurs on the receive side, with all ports being capable of "listening" to any slot on any bus line.

3. A portion of the time slots are reserved for communication between a host processor and local processors, eliminating the need for an additional control bus or communication pathway.

An example of a full-duplex connection between two ports 22 and 24 is shown in FIG. 2. Port A, 22, has been assigned to transmit on bus line 30a, slot 2. Port B, 24, has been assigned to transmit on bus line 30n, slot 4. These "fixed" transmit locations would generally be based on the overall system configuration, but could later be modified if so desired. To set up a connection between the two ports, a local processor would command port A to listen to bus line 30n, slot 4 and command port B to listen to bus line 30a, slot 2.

Since time slots using this architecture serve both transmit and receive functions, only one set of N bus lines 30 is required to implement the same size switch that would require 2N TDM links in the conventional architecture. Port appearances have been reduced from four to two for a full-duplex connection, thereby reducing the amount of system bandwidth required for a given size switch. Each line interface must have access to N bus lines, which is an improvement over 2N TDM links.

Figure 3A:
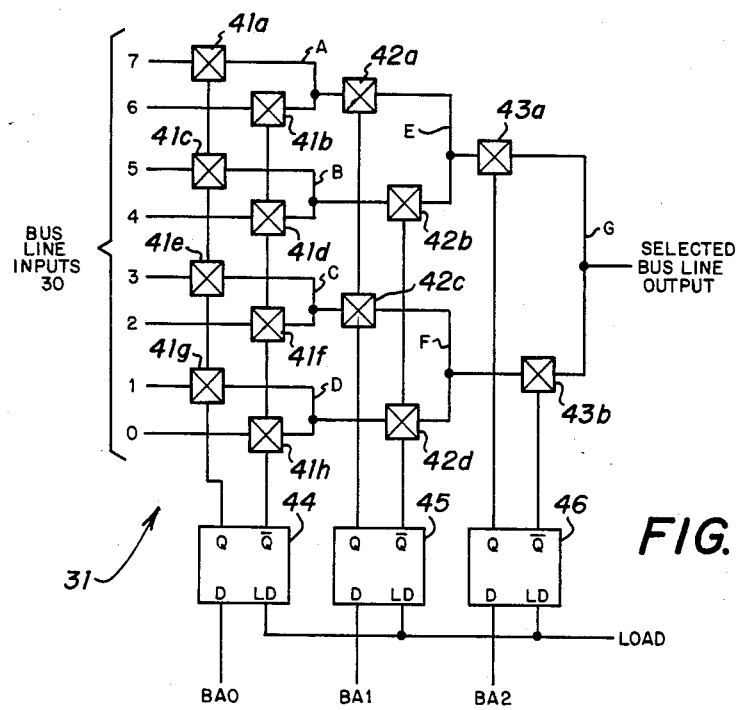
FIGS. 3a and 3b are logic schematic diagrams of a particular embodiment of the bus line selector shown in the block diagram of FIG. 1.
Figure 3B:
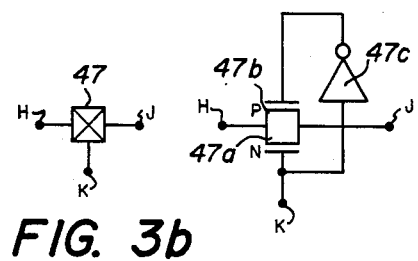

Referring simultaneously to FIGS. 3a and 3b, there is provided a schematic diagram of a preferred embodiment of the bus line selector 31 (FIG. 1). Bus line selector 31 is provided for selecting between bus lines 30a–30n and performs the space switch function of the present switching system 20. Bus line selector 31 includes two portions, a set of latches for storing the bus address and an N-to-1 multiplexer for routing signals from the desired bus line 30a–30n to a single output line based on the bus address provided by local processor interface 38 (FIG. 1).

Bus line selector 31 employs CMOS transmission gates 41a–41h, 42a–42d, 43a and 43b arranged in a tree configuration to perform both multiplexing and address decoding. Operation of the transmission gate element 41, 42 and 43 is shown in FIG. 3b. Transmission gate 47 is a symbolic representation of elements 47a, 47b, and 47c connected as shown. N-channel transistor 47a is connected between nodes H and J. The gate of transistor 47a is connected to node K. P-channel transistor 47b is also connected between nodes H and J. The gate of transistor 47b is connected to the output of inverter 47c. The input of inverter 47c is connected to node K. A logic 1 level on node K results in both transistors 47a and 47b being turned on, thereby connecting nodes H and J together. A logic 0 level on node K results in both transistors 47a and 47b being turned off, thereby isolating nodes H and J.

Referring again to FIG. 3a, bus line 30 inputs 7, 5, 3, and 1 are connected to nodes A, B, C, and D, respectively, by transmission gates 41a, 41c, 41e, and 41g, respectively, controlled by the Q output of a latch 44. Bus line 30 inputs 6, 4, 2, and 0 are connected to nodes A, B, C, and D, respectively, by transmission gates 41b, 41d, 41f, and 41h, respectively, controlled by the $\overline{Q}$ output of latch 44. Nodes A and C are connected to nodes E and F, respectively, by transmission gates 42a and 42c, respectively, controlled by the Q output of a latch 45. Nodes B and D are connected to nodes E and F, respectively, by transmission gates 42b and 42d, respectively, controlled by the $\overline{Q}$ output of latch 45.

Node E is connected to the output node G by a transmission gate 43a controlled by the Q output of a latch 46. Node F is connected to the output node G by a transmission gate 43b controlled by the $\overline{Q}$ output of latch 46. The LD inputs of latches 44, 45, and 46 are connected together to a load input signal received from local processor interface circuitry 38 (FIG. 1). The D inputs of latches 44, 45, and 46 are connected to address inputs BA0, BA1, and BA2, respectively. Inputs BA0, BA1, and BA2 represent binary-weighted address inputs from interface circuitry 38 with BA0 being the least significant bit and BA2 being the most significant bit.

The operation of bus line selector 31 is as follows. The desired bus line address is loaded into latches 44, 45, and 46. This binary address results in a single connection being made between the bus line number corresponding to the binary address and output node G. For example, if an address of 5 (binary 101) is loaded into latches 44, 45, and 46, transmission gates 41c, 42b and 43a will be on, thereby connecting bus line number 5 to output node G. The signal present on bus line number 5 will therefore appear on node G. The circuit shown in FIG. 3a thus provides a space switching function, selecting between multiple bus lines 30a-30n.

Figure 4:
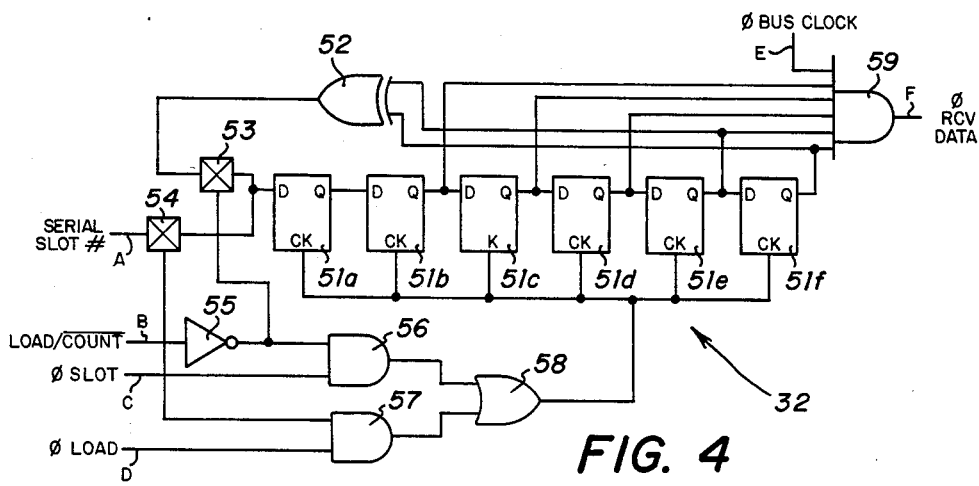
FIG. 4 is a logic schematic diagram of a particular embodiment of the slot counter shown in the block diagram of FIG. 1.

With reference to FIG. 4, there is provided a schematic diagram of a preferred embodiment of the slot counter 32 (FIG. 1). Slot counter 32 furnishes a gated clock during a specified time slot of each frame and performs the time switch function of the present switching system 20. Slot counter 32 is capable of being loaded with a time slot offset address at the beginning of a frame. Slot counter 32 is then clocked such that it advances one count each time slot. When slot counter 32 reaches a specified count value, a bus clock is gated to allow the eight bits of the selected time slot to be clocked into a bus receive register 33 (FIG. 1).

Slot counter 32 includes flip-flops 51a, 51b, 51c, 51d, 51e, and 51f which are connected together in shift register form with the Q output of each flip-flop connected to the D input of the next consecutive flip-flop. The inputs of an exclusive-OR gate 52 are connected to the Q outputs of flip-flops 51e and 51f. A transmission gate 53 connects the output of exclusive-OR gate 52 to the D input of flip-flop 51a controlled by the output of an inverter 55. The input of inverter 55 is connected to node B. A transmission gate 54 connects node A to the D input of flip-flop 51a controlled by node B. The inputs of an AND gate 56 are connected to the output of inverter 55 and node C. The inputs of an AND gate 57 are connected to nodes B and D. The inputs of an OR gate 58 are connected to the outputs of AND gates 56 and 57. The output of OR gate 58 connects to the clock inputs of flip-flops 51a, 51b, 51c, 51d, 51e, and 51f. The inputs of an AND gate 59 connect to node E and the Q outputs of flip-flops 51b, 51c, 51d, 51e, and 51f. The output of gate 59 is connected to node F and provides the bus receive clock output to bus receive register 33 (FIG. 1). The operation of transmission gates 53 and 54 has been previously discussed with respect to FIG. 3b.

In operation of slot counter 32, node B is the LOAD or $\overline{\text{COUNT}}$ control input. If node B is a logic 1 level, transmission gate 53 is off and transmission gate 54 is on, connecting node A to the input of the shift register flip-flop 51a. A slot number offset can then be loaded serially into the shift register at the beginning of a frame time. The logic 1 level on node B also results in the load clock present on node D being gated by gates 57 and 58 to the common clock input of all shift register flip-flops 51. The load clock is thereby used to clock the slot number offset into the shift register. If node B is made a logic 0 level, transmission gate 54 is off and transmission gate 53 is on, connecting the output of exclusive-OR gate 52 to the input of the shift register. This results in the shift register having exclusive-OR feedback from its last two stages, thus forming a shift register generator (SRG) counter.

The logic 0 level on node B also results in the slot clock present on node C being gated by gates 56 and 58 to the common clock input of all flip-flops. The slot clock is thereby used to clock the SRG counter such that it advances one count for each 8-bit time slot. When the slot counter 32 has reached the state where the Q output of flip-flop 51a is a logic 0 and the Q outputs of flip-flops 51b, 51c, 51d, 51e, and 51f are all a logic 1, AND gate 59 will gate the bus clock present on node E to the output node F. This output will be a burst of 8 clocks that can then be used to clock data from the output node G of the bus selector 31 shown in FIG. 3a into the input of the bus receive register 33 (FIG. 1). This burst of 8 clocks will occur at the particular slot time corresponding to the slot number offset initially placed in the shift register.

The slot counter 32 circuit shown in FIG. 4 thus provides a time switching function, selecting between time slots on a given bus line 30. Slot counter 32 is easily loaded in a serial manner with a time slot offset address. Slot counter 32 may be utilized in a 64 slot system operating at 4.096 Mbps. Time slot number 1 is reserved for bus line and slot address loading. Slot counter 32 is then clocked for each of the remaining 63 slots. The result is that the first of eight bus clocks will be output at the selected slot time, thereby clocking time slot data into the bus receive register 33. Since slot counter 32 is never idle for longer than one time slot period, flip-flops 51a-51f can be implemented using dynamic logic techniques.

Figure 5:
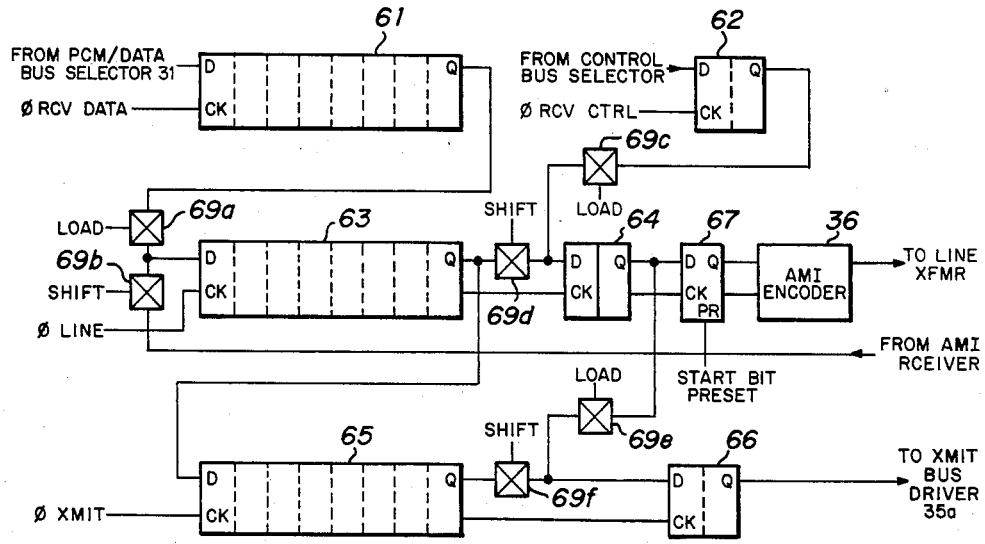
FIG. 5 is a logic schematic diagram of a particular embodiment of the bus and line interface shift registers shown in the block diagram of FIG. 1.

With reference to FIG. 5, there is provided a schematic diagram of a preferred embodiment of the bus receive register 33, bus transmit register 35 and line interface register 34 (FIG. 1). Elements 61 and 62 are 8-bit and 2-bit bus receive shift registers, respectively, comprising bus receive register 33. Elements 63 and 64 are 8-bit and 2-bit line interface shift registers, respectively, and comprise line interface register 34. Elements 65 and 66 are 8-bit and 2-bit bus transmit registers, respectively and comprise bus transmit register 35.

Flip-flop 67 is the start bit flip-flop, capable of being preset to a logic 1 level at the beginning of each frame. AMI encoder 36 is an alternate mark inversion. (AMI) encoder, consisting of circuitry that converts the logic 1 and 0 inputs to a 3-level AMI output code format. Transmission gates 69a, 69b, 69c, 69d, 69e, and 69f select different data paths controlled by LOAD and SHIFT signals. Eight bits of data from a selected PCM or data time slot on a selected bus line 30a-30n are clocked into bus receive register 61 using the receive data clock from slot counter 32 (FIG. 4). Two bits out of eight bits of data from a selected control time slot on a selected bus line are clocked into bus receive register 62 using the receive control clock. Registers 61 and 62 are both clocked at the bus clock rate corresponding to the data rate of the switching bus. This clock rate is generally high, such as 4.096 MHz, to maximize the number of slots that can be fit on a given bus line.

Assuming the LOAD signal is a logic 0 level and the SHIFT signal is a logic 1 level, the input of register 63 is connected to the output of an AMI twisted pair line receiver by transmission gate 69b, the output of register 63 is connected to the input of register 64 by transmission gate 69d, and the output of register 65 is connected to the input of register 66 by transmission gate 69f. Registers 63 and 64 and flip-flop 67 thus form a continuous 11-bit line interface shift register 34. This shift register is used to send and receive data to and from a remote digital instrument such as a telephone or data device using a single twisted pair cable. A transmit burst sent to the remote device begins with a start bit that is always a logic 1. The remote device uses this start bit to synchronize its timing to the burst. Data received from the remote device is decoded using an AMI receiver and is loaded into the same 11-bit line interface register 34. The line interface register 34 is clocked at the line clock rate, limited in frequency to rates such as 256 KHz due to the transmission characteristics of twisted pair wiring. With the SHIFT signal being a logic 1, registers 65 and 66 also form one continuous shift register. Data residing in this shift register is clocked by the transmit clock at the bus clock rate. This data is sent to a single transmit bus driver for transmission on an assigned bus line 30a–30n. At the beginning of each frame, the LOAD signal is made a logic 1 and the SHIFT signal a logic 0. The output of register 61 is thus connected to the input of register 63 by transmission gate 69a, the output of register 62 is connected to the input of register 64 by transmission gate 69c, and the output of register 64 is connected to the input of register 66 by transmission gate 69e. These connections allow data read from the bus residing in registers 61 and 62 to be transferred to registers 63 and 64 for subsequent transmission to the remote device, and also allow data received from the remote device residing in registers 63 and 64 to be transferred to registers 65 and 66 for subsequent transmission back on to the switching bus 30. These registers thus provide translation between bus timing and twisted pair line timing. The operation of gate 69 has been previously explained in connection with FIG. 3b.

It therefore can be seen that registers 33, 34 and 35 (FIG. 1) operate to receive data from switching bus 30, to transmit to and receive data from a remote digital device in a "ping-pong" manner and to transmit receive data back onto switching bus 30. In order to maximize the number of channels on a given bus line, a relatively high clock rate is used for data on bus 30. For example, a clock rate of 4.096 MHz will allow 64 time slots to fit within the standard 125 microsecond frame. This clock rate, however, is too high for data transmission on standard twisted pair telephone wire. This is due to the transmission characteristics of twisted pair wire. Therefore, registers 33, 34 and 35 as shown in FIG. 1, buffer data received from bus 30 such that the data can be sent to the remote digital telephone or data device at a slower rate for example, 256 KHz. Similarly, register 35 (FIG. 1) is required to buffer data received from the remote device at the slower clock rate such that it can be placed on bus 30 at the higher clock rate. All registers within registers 33, 34 and 35 shown in FIG. 5, are clocked at the bus clock rate at the beginning of each frame. This allows data from the bus 30 to be transferred into the line interface registers 34 for transmission to the remote device as well as to allow data previously received from the remote device to be transferred into the bus transmit register 35. Transferring data between registers in this serial fashion is thereby accomplished with less circuitry than would be required to perform a parallel load from one register to another, thus saving integrated circuit die area. Since all registers are clocked every frame, the register flip-flops can be implemented using dynamic logic techniques.

Figure 6:
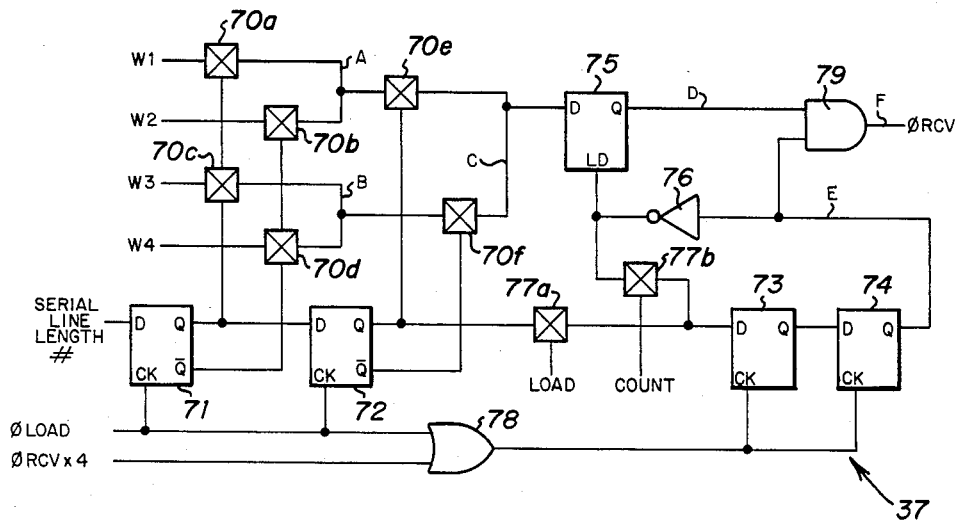
FIG. 6 is a logic schematic diagram of a particular embodiment of the line length adjustment counter shown in the block diagram of FIG. 1.

With reference to FIG. 6, there is provided a schematic diagram of a preferred embodiment of the line length adjustment counter 37. Line length adjustment counter 37 is provided to facilitate the positioning of receive clock strobes to compensate for the propagation delay of a twisted pair telephone line due to its transmission characteristics.

All transmit bursts sent to remote digital devices occur simultaneously. Receive bursts, however, arrive back at the line interface circuitry at different times depending on the length of wire connected to that port. The line interface receive clock must therefore be positioned so as to reliably strobe incoming data. This is accomplished using a local processor, a line length adjustment counter, and start bit timing feedback. The return burst from the remote instrument consists of a start bit followed by control and PCM or data bits. The line length adjustment counter 37 has the capability of skewing the receive clock by fractions of bit times (position within a data bit) as well as full bit times. The positioning of the clock strobes is performed according to the following algorithm:

1. A local processor loads a value into the line length adjustment counter 37 selecting the earliest bit time and position within the bit time. This corresponds to the shortest line length; hence the smallest propagation delay.

2. The local processor increments the counter 37 thereby delaying the receive clock a fraction of a bit at a time. The processor monitors the start bit location of the line interface register 34 to see if the start bit (always a logic 1) has been clocked in. Once the start bit is seen, the processor stores the line length counter value.

3. The processor continues to increment the counter 37 until the start bit is no longer seen in its proper position in the line interface register. The processor averages this count value with the previously stored count value to arrive at a value that will result in the receive clock being positioned close to the center of the bit time, thus maximizing noise immunity. This value is then loaded into the counter and reliable reception of data occurs.

The Q output of a flip-flop 71 is connected to the D input of a flip-flop 72 and the Q output of a flip-flop 73 is connected to the D input of a flip-flop 74. The Q output of flip-flop 74 is connected to the input of an inverter 76. In operation, assuming the COUNT signal is made a logic 0 and the LOAD signal is made a logic 1, the Q output of flip-flop 72 is connected to the D input of flip-flop 73 by a transmission gate 77a. This results in flip-flops 71, 72, 73, and 74 being configured as a continuous shift register, allowing a line length value to be loaded serially into the register using the load clock. After the line length value has been loaded, the LOAD signal is made a logic 0 and the COUNT signal is made a logic 1. This connects the output of inverter 76 to the D input of flip-flop 73, resulting in flip-flops 73 and 74 and inverter 76 forming a 2-bit, divide by four Johnson counter. This counter is clocked by a signal 21 four times greater than the desired receive clock output, gated by an OR gate 78.

The clock frequency seen at node E is the input clock frequency divided by four, with the first edge occurring at four possible times during a given bit time depending on the 2-bit binary code initially placed in counter flip-flops 73 and 74. The window signals W1, W2, W3, and W4 are L-bit wide signals delayed by 0, 1, 2, and 3 bit times, respectively, and are received from clock generation circuitry 39 (FIG. 1). Signals W1 and W3 are connected to nodes A and B, respectively, by transmission gates 70a and 70c, respectively, controlled by the Q output of flip-flop 71. Signals W2 and W4 are connected to nodes A and B, respectively, by transmission gates 70b and 70d, respectively, controlled by the $\overline{Q}$ output of flip-flop 71. Node A is connected to node C by transmission gate 70e, controlled by the Q output of flip-flop 72. Node B is connected to node C by transmission gate 70f controlled by the $\overline{Q}$ output of flip-flop 72.

Operation of flip-flops 71 and 72 and transmission gates 70a, 70b, 70c, 70d, 70e, and 70f is similar to the bus line selector circuit shown in FIG. 3a. A 2-bit binary code placed in flip-flops 71 and 72 selects one signal (W1, W2, W3, or W4) and routes it to node C. For example, a logic 1 in flip-flop 71 and a logic 0 in flip-flop 72 will result in transmission gates 70c and 70f both being on, resulting in the signal present on W3 being selected. A latch 75 synchronizes the selected window signal to the Johnson counter output. Synchronization is achieved by loading latch 75 with the selected window signal using the counter output signal present on the output of inverter 76. The inputs of AND gate 79 connect to node D, the synchronized window signal, and node E, the Johnson counter output. The output of an AND gate 79 connects to node F and provides the receive line clock output.

The complete counter 37 shown in FIG. 6 thereby provides an output burst to register 34 consisting of L clocks capable of being delayed in time up to four bit times using W1, W2, W3, or W4, with a resolution of four positions within the bit time depending on the value placed in the Johnson counter.

Figure 7:
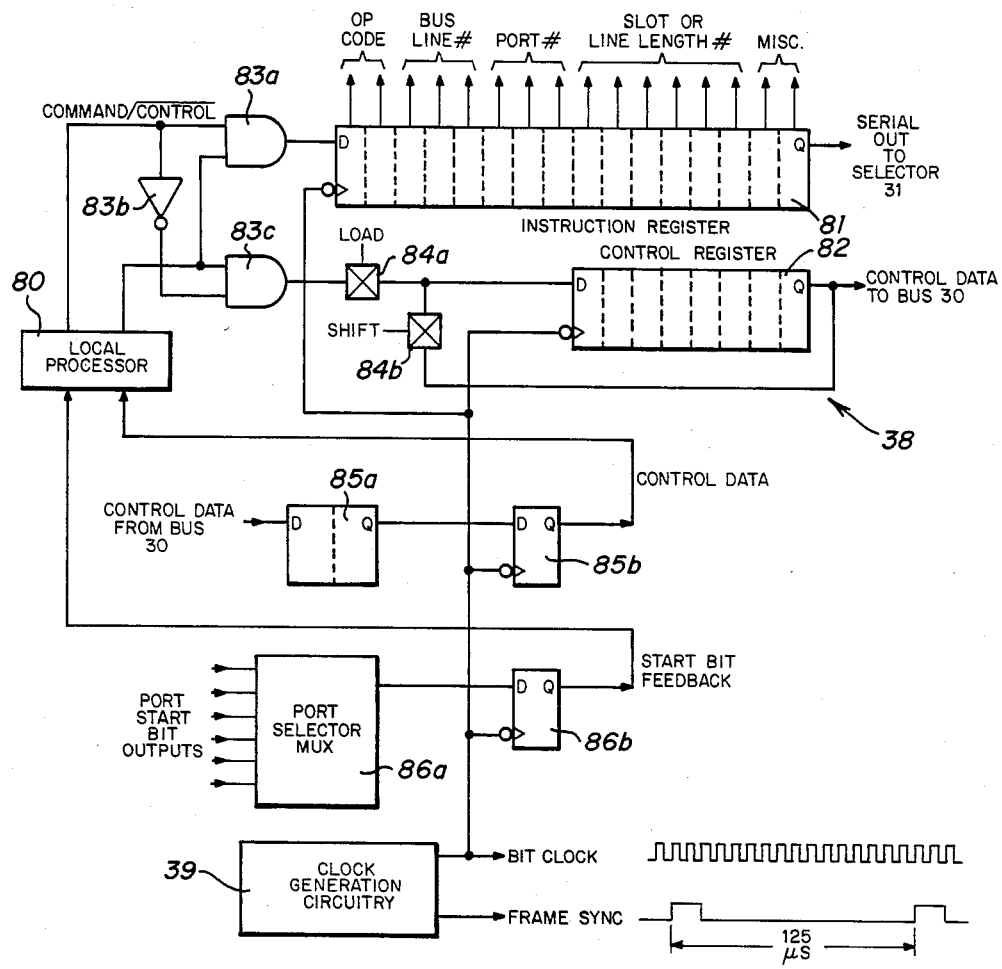
FIG. 7 is a logic schematic diagram of a particular embodiment of the microprocessor interface shown in the block diagram of FIG. 1.

Referring now to FIG. 7, there is provided a schematic diagram of a preferred embodiment of the local microprocessor interface 38 (FIG. 1). Local microprocessor interface 38 allows a local processor to perform the following functions:

1. Issue commands to the switch chip 20 to select bus line addresses and time slot addresses, write line length counter values, and select various modes of operation.

2. Communicate with a host processor by transmitting to and receiving control information from the switch chip. This information is communicated to and from the bus 30 by the switch chip 20. A separate processor-to-processor communication pathway is not required.

3. Monitor start bit feedback to perform line length timing adjustments.

4. Synchronize communication with the switch chip 20 by using timing signals provided to the processor by the switch chip 20.

Element 81 is an instruction register provided to allow a local processor 80 to issue commands to the switch chip 20 to select bus line addresses and time slot addresses, write line length counter values, and select various modes of operation. Register 81 is loaded with data from the local processor 80 in a serial manner using an AND gate 83a. Element 82 is an 8-bit control register provided to allow the local processor 80 to transmit control information to a host processor by using the switching bus. An inverter 83b, an AND gate 83c and a transmission gate 84a allow register 82 to be loaded with a control character from the local processor 80 in a serial manner. Transmission gate 84b allows the output of register 82 to be connected back to the input of register 82 to allow the 8-bit control character to continuously loop around the register. This loop insures that the character is sent repetitively to the host processor via the switching bus 30 until acknowledged.

Element 85a is a 2-bit bus receive register. Flip-flop 85b latches control information read from the bus one bit at a time and presents it to the local processor 80. This allows control information to be received from a host processor using the switching bus.

Element 86a is a port selector multiplexer. Multiplexer 86a allows the start bit flip-flop output from the line interface register 34 of a selected port to be routed to the input of flip-flop 86b. Flip-flop 86b latches this received start bit and presents it to the local processor 80. This start bit feedback allows the local processor 80 to intelligently adjust line length counter 37 values to compensate for the propagation delays of different length lines.

Clock generation circuitry 39 provides two timing signals for the local processor 80. The bit clock furnishes the local processor 80 with the timing required for loading each bit of information into registers 81 and 82, and for reading each bit of information from flip-flops 85b and 86b. The frame sync signal generated by clock generation circuitry 39 furnishes the local processor 80 with the timing required for a full command or control character. This signal insures that commands and control characters are properly aligned in registers 81 and 82, respectively. In summary, the microprocessor interface circuitry 38 shown in FIG. 7 allows a local processor 80 to issue commands to the switch chip 20, communicate in both directions with a host processor using the common switching bus 30, and monitor start bit feedback to perform line length timing adjustments. In addition, the microprocessor interface 38 circuitry provides timing signals to the local processor to allow it to synchronize its communication with the switch chip.

Therefore it can be seen that the present distributed switching system provides for a novel switching bus architecture that replaces the conventional switch matrix. This bus architecture includes a bus line selector for selecting one of a plurality of lines, each bus line consisting of a continuous serial data stream partitioned into time slots. A slot counter is utilized by the present switching system to select one of a plurality of time slots wherein each time slot consists of eight bits of serial data representing a voice sample, control information or transparent data. The present invention further utilizes shift registers for receiving data from a high speed serial bus, for transmitting to and receiving data from a remote digital device in a ping-pong manner, and for transmitting received data back on the serial bus. A line length adjustment counter is provided to facilitate positioning of received clock strobes to compensate for the propagation delay of a twisted pair telephone line due to its transmission characteristics. The present invention further provides for a microprocessor interface to allow slot assignments, bus line selections and line-length adjustments to be performed by a local processor and enable the local processor to communicate with a host processor using the same serial communication bus.

Whereas the preset invention has been described with respect to specific embodiments thereof, it will be understood that various changes and modifications will be suggested to one skilled in the art and it is intended to encompass such changes and modifications as fall within the scope of the appended claims.

We claim:

1. In a communication system for the communication of voice and data having a local processor, a host processor, data devices having line interfaces and a distributed switching system interconnecting the processors and data devices, an improved switching bus providing for communication between the processors and communication between the data devices comprising:

a plurality of bus lines being time division multiplexed serial data streams and having time slots used for both transmit and receive directions and being connected to the host processor and the distributed switching system;

each of said bus lines having time slots which may be used for processor communication and time slots which may be used for transparent switching of voice and data; and said plurality of bus lines comprising a single bidirectional bus used for both communication between the local processor and the host processor and for transparent switching of voice and data.

2. A distributed switching system for the communication of voice and data for use with digital instruments, a local processor and a host processor, the distributed switching system being implemented in an integrated circuit comprising:

a plurality of bus lines being time division multiplexed serial data streams and having time slots used for both transmit and receive directions and being connected to the host processor and the distributed switching system;

each of said bus lines having time slots which may be used for processor communication and time slots which may be used for transparent switching of voice and data;

said plurality of bus lies comprising a single bidirectional bus used for both communication between the local processor and the host processor and for transparent switching of voice and data;

bus line selector means for selecting one of said plurality of bus lines for performing a space switching function;

slot counter means for selecting one of said time slots to perform a time switching function;

bus interface shift registers interconnected to said plurality of bus lines for transmitting to and receiving data from said plurality of bus lines; and line interface shift registers for transmitting to and receiving data from the digital instruments.

3. The distributed switching system of claim 2 and further including:

line-length adjustment means for facilitating positioning of receive clock strobes.

4. The distributed switching system of claim 3 wherein said line-length adjustment means includes:

means for selecting one of a plurality of timing signals spaced one bit apart.

5. The distributed switching system of claim 4 wherein said line-length adjustment means further includes:

a counter capable of being initialized to a desired starting value to provide an output timing signal at a plurality of different times within one bit time frame.

6. The distributed switching system of claim 2 and further including:

microprocessor interface means for allowing slot assignments, bus line selections and line-length adjustments to be performed by a local processor and enable said local processor to communicate with a host processor using said plurality of bus lines.

7. The distributed switching system of claim 6 wherein said microprocessor interface means includes:

an instruction register loadable by the local processor to facilitate slot assignments, bus line selections and line-length adjustments.

8. The distributed switching system of claim 6 wherein said microprocessor interface means includes:

a control register loadable by a local processor for operating in a continuous loop, thereby enabling the local processor to repeatedly send a control word to the host processor until acknowledged by the host processor.

9. The distributed switching system of claim 2 and further including:

clock generation means for providing timing signals to said shift registers.

10. The distributed switching system of claim 2 wherein said bus line selector means includes a plurality of transmission gates arranged in a tree configuration to perform both address decoding and multiplexing functions.

11. The distributed switching system of claim 2 wherein said slot counter means includes a shift register generator.

12. The distributed switching system of claim 2 wherein said slot counter means includes dynamic shift register flip-flops.

13. The distributed switching system of claim 2 wherein said bus interface shift registers include:

a first shift register for storing data read from said plurality of bus lines at a desired clock time;

a second shift register for sending data to and receiving data from the digital instrument;

a third shift register for writing data received from the digital instrument to one of said plurality of bus lines at a desired slot time;

means for transferring data from said first shift register to said second shift register; and means for transferring data from said second shift register to said third shift register.

14. The distributed switching system of claim 2 wherein said bus interface shift registers include dynamic shift register flip-flops.

15. The distributed switching system of claim 2 wherein said line-length adjustment means includes:

a plurality of transmission gates arranged in a tree configuration to thereby select timing signals spaced one bit time apart.

16. The distributed switching system of claim 2 and further including:

clock generation means for providing timing signals including bit and frame timing signals to enable a local processor to write data into the distributed switching system synchronously with the internal timing of the distributed switching system.

17. A communication system for the communication of voice and data having a local processor, a host processor, data devices having line interfaces and a distributed switching system interconnecting the processors and data devices comprising:

a plurality of bus lines being time division multiplexed serial data streams and having time slots used for both transmit and receive directions and being connected to the host processor and the distributed switching system;

each of said bus lines having time slots which may be used for processor communication and time slots which may be used for transparent switching of voice and data;

said plurality of bus lines comprising a single bidirectional bus used for both communication between the local processor and the host processor and for transparent switching of voice and data; and space and time switching means interconnected to each line interface of the data devices for distribution of both switching and processing functions to the line interfaces by performing switching functions on a per-port basis.

18. The communication system of claim 17 wherein tone cadencing, paging, and monitoring of broadcast control information is processed by the local processor.

19. The communication system of claim 17 wherein said switching means operates on data received from said plurality of bus lines.

* * * * *